(12) United States Patent
Al-banna (10) Patent No.: US 9,596,152 B2
(45) Date of Patent: Mar. 14, 2017

(54) IDENTIFYING WIDEBAND IMPULSE NOISE THROUGH A GROUP OF SMALL CHANNELS

(71) Applicant: ARRIS Enterprises, Inc., Suwanee, GA (US)

(72) Inventor: Ayham Al-banna, Orland Park, IL (US)

(73) Assignee: ARRIS Enterprises, Inc., Suwanee, GA (US)

(*) Notice: Subject to any disclaimer, the term of this patent is extended or adjusted under 35 U.S.C. 154(b) by 132 days.

(21) Appl. No.: 14/200,254

(22) Filed: Mar. 7, 2014

(65) Prior Publication Data

US 2015/0256420 A1    Sep. 10, 2015

(51) Int. Cl.
*H04L 12/26* (2006.01)
*H04B 3/46* (2015.01)
*H04L 27/26* (2006.01)
*H04L 1/00* (2006.01)
*H04B 7/26* (2006.01)
*H04B 17/345* (2015.01)

(52) U.S. Cl.
CPC ............... *H04L 43/04* (2013.01); *H04B 3/46* (2013.01); *H04L 1/0003* (2013.01); *H04L 27/2623* (2013.01); *H04L 27/2636* (2013.01); *H04L 43/08* (2013.01); *H04B 7/26* (2013.01); *H04B 17/345* (2015.01)

(58) Field of Classification Search
CPC . H04L 27/26; H04L 27/2662; H04L 27/2665; H04L 43/04; H04L 43/08; H04L 12/26; H04B 3/46

USPC ....... 370/208, 210, 252, 281, 290, 292, 295, 370/310
See application file for complete search history.

(56) References Cited

U.S. PATENT DOCUMENTS

| | | | |
|---|---|---|---|
| 6,483,814 B1* | 11/2002 | Hsu .................. | H04B 7/26 370/277 |
| 2005/0174966 A1* | 8/2005 | Lansford ............ | H04L 5/06 370/329 |
| 2006/0159003 A1* | 7/2006 | Nanda ................ | H04W 16/10 370/203 |
| 2008/0075157 A1* | 3/2008 | Allen ................. | H04B 17/345 375/227 |
| 2010/0008230 A1* | 1/2010 | Khandekar ......... | H04W 16/10 370/237 |
| 2010/0097923 A1* | 4/2010 | Zhao ................. | H04J 11/0026 370/210 |

* cited by examiner

*Primary Examiner* — Jae Y Lee
*Assistant Examiner* — Jean F Voltaire
(74) *Attorney, Agent, or Firm* — Bart A. Perkins (57) ABSTRACT

Methods, systems, and computer readable media can be operable to determine impulse noise over a wide spectrum based upon measurements of impulse noise associated with each of a plurality of channels. Impulse noise can be observed on each of the plurality of channels and the observed impulse noise signals can be summed together. In summing observed impulse noise signals, a Fourier transform can be used to convert the observed impulse noises from a time domain representation to a frequency domain representation. The sum of the impulse noises can represent the impulse noise existing on the wide spectrum and can be converted from a frequency domain representation to a time domain representation using an inverse Fourier transform.

20 Claims, 5 Drawing Sheets

IDENTIFYING WIDEBAND IMPULSE NOISE THROUGH A GROUP OF SMALL CHANNELS

TECHNICAL FIELD

This disclosure relates to measuring impulse noise characteristics over a wide spectrum.

BACKGROUND

The Data-Over-Cable Service Interface Specification (DOCSIS) was established by cable television network operators to facilitate transporting data traffic, primarily Internet traffic, over existing cable television (e.g., community antenna television (CATV)) networks. In addition to transporting data traffic, as well as television content signals over a CATV network, multiple services operators (MSO) also use their CATV network infrastructure for carrying voice, video on demand (VoD) and video conferencing traffic signals, among other services.

A wired network, such as a CATV network, or other broadband facilities-based network, can experience noise that impedes or degrades information transmission. The noise on a wired network can be frequency-specific or time-specific. Time-based noise is often called impulse noise since it has some of the characteristics of a mathematical impulse. Generally, impulse noise occurs at a certain time or within a certain period, but tends to contaminate a wide spectrum of frequencies on the network.

Typically, in order to measure impulse noise over a wideband spectrum, traffic on all channels of the wideband spectrum must be simultaneously stopped and a time domain capture must then be taken of all channels on the wideband spectrum. Simultaneously stopping traffic on multiple channels generally presents several problems. For one, the quality of service experienced by customers is reduced when traffic on multiple channels is simultaneously stopped. Further, the span of time associated with a domain capture is generally reduced as the capture band gets wider, thereby making an accurate measurement of wideband impulse noise difficult to obtain.

Therefore, it is desirable to improve upon the techniques for measuring impulse noise over a wideband spectrum.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

Like reference numbers and designations in the various drawings indicate like elements.

DETAILED DESCRIPTION

Impulse noise can become intermixed with a signal being transmitted over a wideband spectrum. Disclosed herein are techniques for measuring impulse noise in a wideband spectrum (e.g., a plurality of channels having a common source, path, node, destination, etc.) while maintaining signal transmission traffic on the spectrum. In embodiments, the disclosed techniques are effective to measure the amount of impulse noise on a wideband spectrum without having to simultaneously stop signal transmissions along the spectrum to isolate the impulse noise. For example, a cable modem termination system (CMTS) can stop traffic on a plurality of channels, capture time domain samples from each of the plurality of channels, and identify the impulse noise observed on each of the plurality of channels. The impulse noise within a channel can be different from the impulse noise observed over a larger wideband spectrum. For example, the impulse noise within a channel may be a portion of the energy of wideband impulse noise covering a larger portion of the spectrum. In embodiments, observed impulse noise within a plurality of channels (e.g., all channels on a wideband spectrum, or less than all of the channels on a wideband spectrum) associated with a wideband spectrum can be used to measure the impulse noise observed over the wideband spectrum. For example, a measurement of impulse noise within a plurality of channels can be bandwidth-limited so that less than all of the channels on a wideband spectrum are measured.

In embodiments, the impulse noise observed in each of a plurality of channels may be converted, e.g., using Fourier Transforms, from the time domain to the frequency domain, and the frequency domains associated with the plurality of channels can be processed (e.g., summed) together to generate a frequency domain measurement of impulse noise over a wideband spectrum. In embodiments, the frequency domain of impulse noise over the wideband spectrum is converted to the time domain using an inverse Fourier transform.

Figure 1:
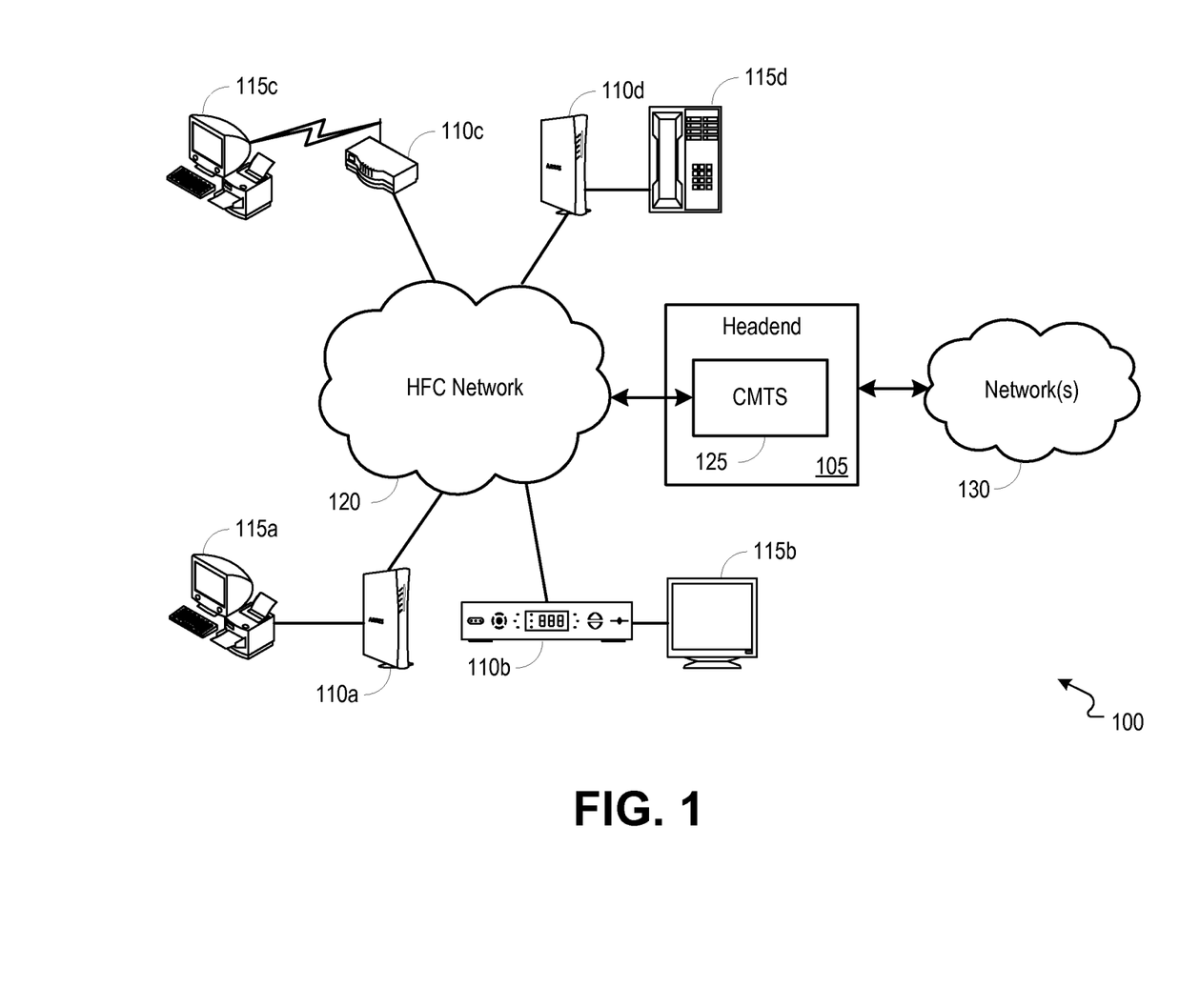
FIG. 1 is a block diagram illustrating an example network environment operable to measure impulse noise over a wide spectrum.

FIG. 1 is a block diagram illustrating an example network environment 100 operable to measure impulse noise over a wide spectrum. In embodiments, a headend 105 can provide video service(s) and/or data service(s) to customer premise equipment (CPE) devices 110a-d in one or more subscriber groups (e.g., service group(s)).

A cable television headend is a master facility for receiving television signals for processing and distributing content over a cable television system. The headend typically is a regional or local hub that is part of a larger service provider distribution system, such as a cable television distribution system. An example is a cable provider that distributes television programs to subscribers, often through a network of headends or nodes, via radio frequency (RF) signals transmitted through coaxial cables or light pulses through fiber-optic cables. In embodiments, content is received at the headend from a content source (such as a content server of a program provider).

The headend 105 can facilitate communications between one or more network(s) 130 and the CPE devices 110a-d via network 120. In various implementations, the network(s)

130 can include one or more networks internal to the headend and/or one or more networks external to the headend (e.g., one or more extranets, the Internet, etc.). The network 130 represents at least one source of content delivered via the headend to the CPE devices 110a-d via the network 120. For example, the network 130 represents any number of possible cable or content provider networks,e.g., multiple service operators (MSOs), such as cable and broadband service providers who provide either or both cable and Internet services to subscribers, and operate content delivery networks.

Network 130 may include any suitable architecture (e.g., satellite, fiber, the Internet, etc.) for distributing content to the headned 105. For example, the network(s) 130 an operate using internet protocol (IP), sending data packets to and receiving data packets from the headend 105. Similarly, network 120 can include any suitable architecture or transmission medium such as an optical fiber, a coaxial cable, or other suitable transmission media or wireless telecommunications. In an exemplary embodiment, content delivery network 120 comprises a hybrid fiber coaxial (HFC) network.

CPE devices 110a-110d can include, for example, a cable modem, a set-top box, a wireless router including an embedded cable modem, a media terminal adapter (MTA), a digital subscriber line (DSL) modem, a voice over internet protocol (VOIP) terminal adapter, a video game console, a digital versatile disc (DVD) player, a communications device, or the like. By way of example, FIG. 1 depicts a cable modem or embedded MTA 110a, a set top box 110b, a wireless router 110c, and an MTA 110d. The cable modem or embedded MTA (eMTA) 110a is shown facilitating communications from the headend 105 to a computer 115a. The set-top box 110b is shown facilitating communications from the headend 105 to a television 115b or a digital video recorder (DVR). A wireless router 110c is shown facilitating wireless communications between a computer 115c and a headend 105. An MTA 110d is shown facilitating communications between a telephone 115d and a headend 105.

In embodiments, the headend 105 can separate video content into various streams or channels to be transmitted (e.g., broadcast, multicast, unicast, etc.) to the CPE devices 110a-d. For example, each of the various streams or channels can represent a specific bandwidth at a frequency associated with a specific content provider and/or network.

In embodiments, a CMTS 125 schedules transmissions of data packets on various channels and at various periods of time. For example, a CMTS 125 can schedule a period of time in which no data packets are transmitted along one or more specific channels. In embodiments, the CMTS 125 can identify one or more channels and corresponding periods of time during which no data packets are scheduled for transmission along the one or more channels. For example, the CMTS 125 can identify the one or more channels and corresponding periods of time from a transmission schedule.

In embodiments, as a CMTS 125 schedules traffic across its subtending channels, it can temporarily prevent the transmission of data packets along a specified channel. By preventing data transmission along a channel, the CMTS 125 can isolate and measure any signals or noise remaining on the channel (e.g., impulse noise). Impulse noise can be introduced into a channel by various causes and in a variety of manners (e.g., voltage spikes in network equipment, voltage changes in adjacent cables, network maintenance and testing, lightning strikes, electric motors, car starters, etc.).

Figure 2:
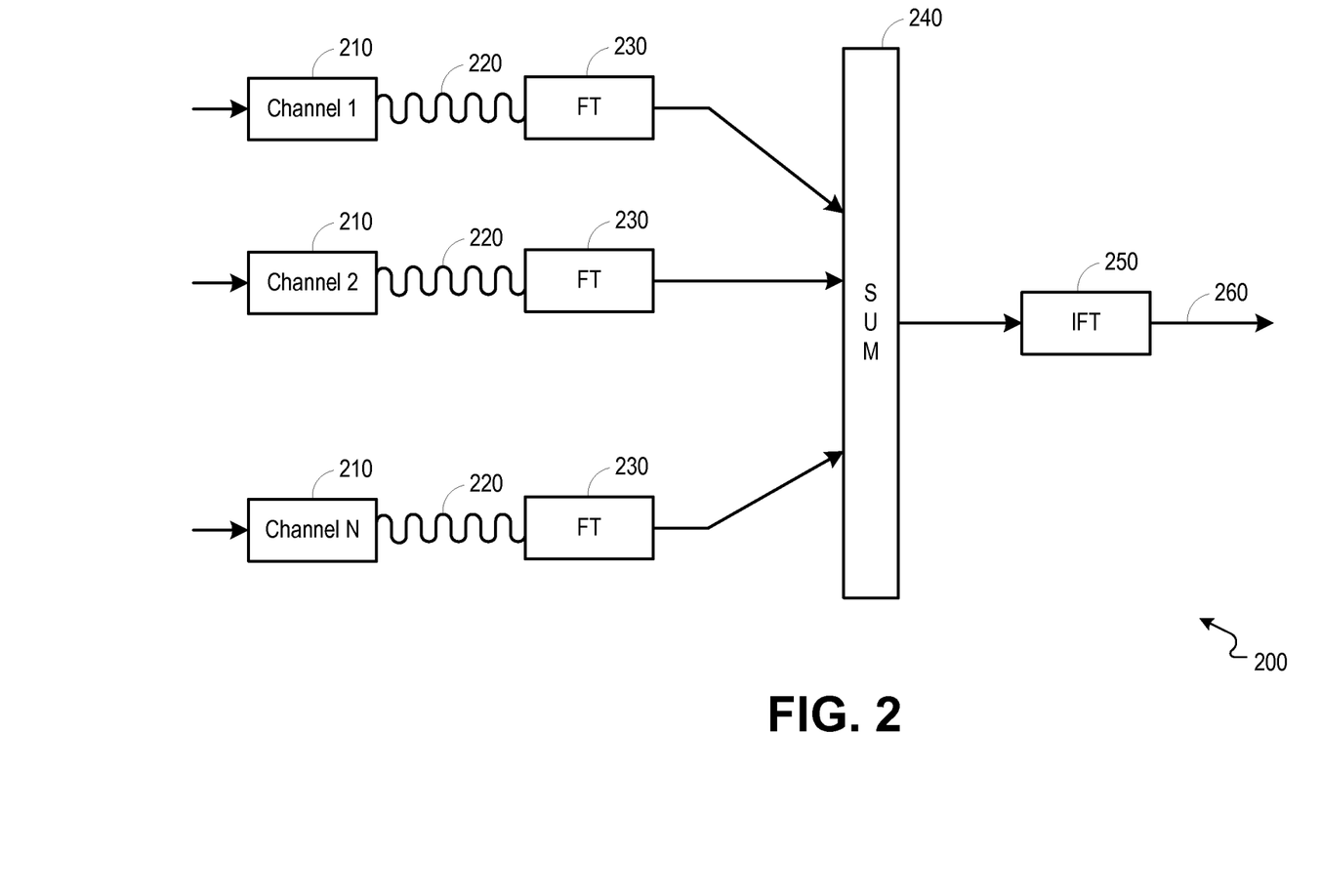
FIG. 2 is a block diagram illustrating an example process operable to determine impulse noise over a wide spectrum based upon measurements of impulse noise associated with each of a plurality of channels.

FIG. 2 is a block diagram illustrating an example process 200 operable to estimate impulse noise over a wide spectrum based upon measurements of impulse noise associated with each of a plurality of channels. In embodiments, the plurality of channels can be all of the channels on a wide spectrum or less than all of the channels on a wide spectrum. The wide spectrum can comprise a plurality of channels, and, in some implementations, the impulse noise over the wide spectrum can be estimated from measurements of impulse noise at each of a group or subset of the plurality of channels (e.g., channels 1-N 210) sampled from within the wide spectrum of interest. In embodiments, the plurality of channels can comprise all, or a portion of, the channels within a subscriber group (e.g., each channel associated with a common node), and the group or subset of the plurality of channels can comprise any of the channels that are silent (e.g., traffic is stopped on the channel, data packets are not being transmitted on the channel, no data transmissions are scheduled on the channel, etc.) at a specific time.

In embodiments, the impulse noise at each channel (e.g., narrowband impulse noise 220) can be measured for a period of time using a time domain capture capability of a CMTS. For example, impulse noise on a channel can be measured for a predetermined period of time. As another example, impulse noise on a channel can be measured during the entirety or a portion of a period in which no data packets are scheduled for transmission on a channel.

In embodiments, a CMTS, using a time domain capture capability, can isolate any impulse noise on a channel when no other traffic is present on the channel. For example, a CMTS can identify one or more channels and stop data traffic on the one or more channels. As another example, a CMTS can identify one or more time periods during which one or more channels are not scheduled for data packet transmission.

In embodiments, noise on one or more channels can be measured regardless of whether traffic is present on the one or more channels. For example, noise on each of a plurality of channels can be measured, and if a determination is made that data packets were transmitted on one or more of the plurality of channels during the measurement, the measurements of the noise on the one or more channels can be ignored for purposes of estimating impulse noise over a wide spectrum.

In embodiments, impulse noise on each of a plurality of channels can be measured for the same period of time. For example, impulse noise can be measured on each of the plurality of channels for as long as each of the plurality of channels is silent (e.g., traffic is stopped on the channel, data packets are not being transmitted on the channel, no data transmissions are scheduled on the channel, etc.). In embodiments, impulse noise on a plurality of channels can be measured constantly, intermittently, or periodically.

In embodiments, the impulse noise at each channel, as measured over a period of time, can be converted from a time domain representation to a frequency domain representation. For example, a Fourier transform (FT) algorithm (e.g., FT 230) can be used to convert impulse noise at each channel into the frequency domain.

In embodiments, the frequency domains defining the impulse noise at each channel can be added together to calculate the sum of impulse noise measured on a group of channels (e.g., impulse noise sum 240). For example, the frequency domains that are added together can be those that are associated with measurements of impulse noise at a plurality of channels that are obtained over a common period of time. In embodiments, the impulse noise sum 240 can be a single frequency domain comprising the impulse noise measured on a group of channels (e.g., channels 1-N 210).

In embodiments, the time domain of the impulse noise sum 240 can be generated by applying an inverse Fourier transform to the impulse noise sum 240. For example, an inverse Fourier transform (IFT) algorithm (e.g., IFT 250) can be applied to the impulse noise sum 240 in order to calculate the time domain of impulse noise on the wide spectrum associated with channels 1-N 210 (e.g., wideband impulse noise 260).

Figure 3:
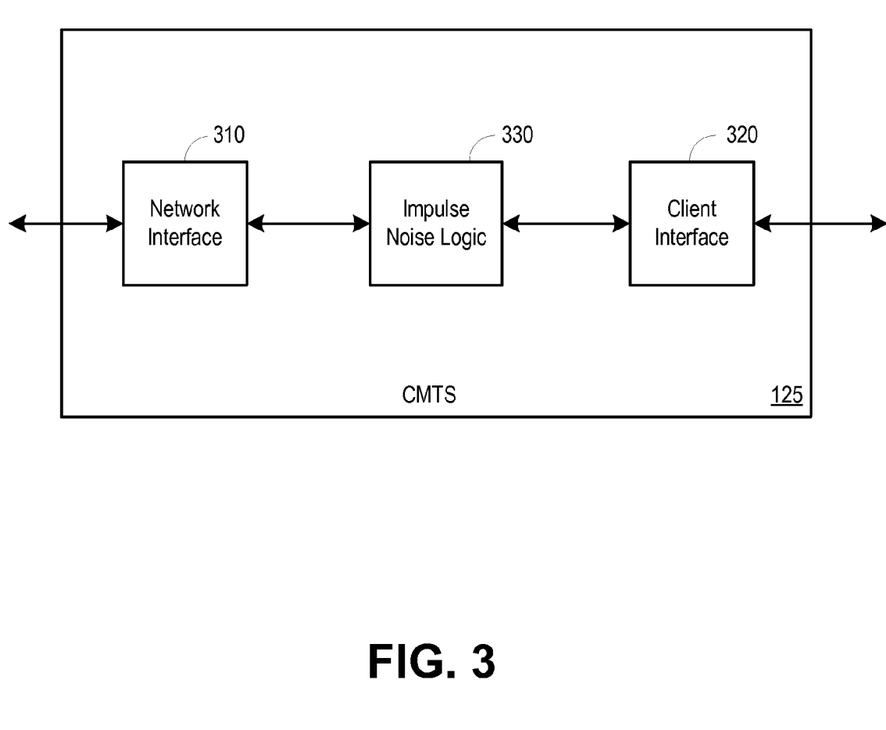
FIG. 3 is a block diagram illustrating an example CMTS operable to determine impulse noise over a wide spectrum based upon measurements of impulse noise associated with each of a plurality of channels.

FIG. 3 is a block diagram illustrating an example CMTS 125 operable to determine impulse noise over a wide spectrum based upon measurements of impulse noise associated with each of a plurality of channels. In embodiments, the plurality of channels can be all of the channels on a wide spectrum or less than all of the channels on a wide spectrum. The CMTS 125 can include a network interface 310, a client interface 320, and impulse noise logic 330. In embodiments, the network interface 310 is an Ethernet interface and can be used to provide an interface to one or more networks (e.g., network(s) 130 of FIG. 1). In embodiments, the client interface 320 is a radio frequency interface (e.g., coaxial cable) and can be used to provide an interface to a HFC network (e.g., HFC network 120 of FIG. 1. It should be understood that in various implementations, the client interface 320 can be a generic network interface to a local area network (LAN), wide area network (WAN), or other applicable broadband network. In various implementations, the client interface 320 can be used to provide an interface to one or more CPE devices (e.g., CPE devices 110*a-d*).

In embodiments, impulse noise logic 330 can be operable to measure impulse noise in one or more individual channels. For example, impulse noise logic 330 can isolate any impulse noise on a specific channel when no traffic is present on the channel.

In embodiments, impulse noise logic 330 can be operable to generate a frequency domain representation of the impulse noise measured at each of the one or more channels (e.g., using a FFT algorithm), sum the one or more frequency domain representations of the individual channels, and generate a time domain representation of the wideband impulse noise by applying an IFFT algorithm against the sum of frequency domain representations.

Figure 4:
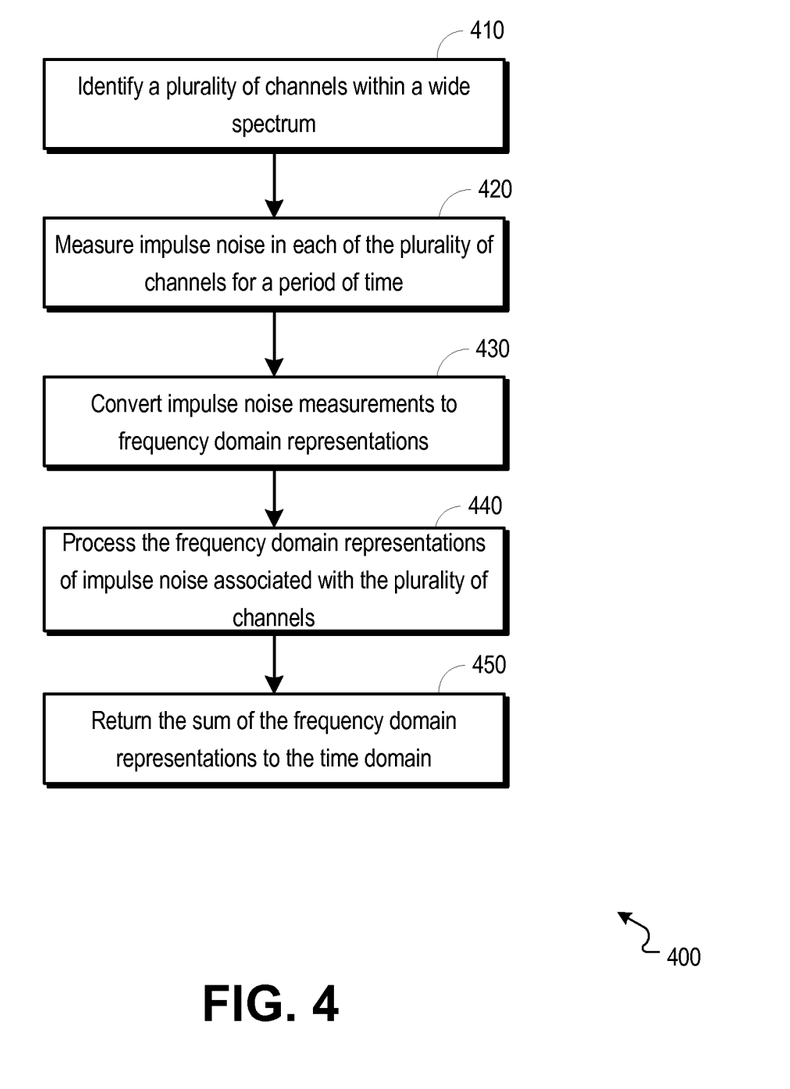
FIG. 4 is a flowchart illustrating an example process operable to determine impulse noise over a wide spectrum based upon measurements of impulse noise associated with each of a plurality of channels.

FIG. 4 is a flowchart illustrating an example process 400 operable to determine impulse noise over a wide spectrum based upon measurements of impulse noise associated with each of a plurality of channels. The process 400 can begin at stage 410, where a plurality of channels within the wide spectrum is identified. In embodiments, the plurality of channels that are identified can be channels that are silent. For example, the plurality of channels that are identified can be channels on which no signals are scheduled to be transmitted at a specific time. As another example, a plurality of channels within the wide spectrum can be identified, regardless of whether signals are scheduled to be transmitted on the channels at a specific time, and traffic on one or more of the plurality of channels can be temporarily stopped.

At 420, impulse noise in each of the plurality of channels identified at 410 is measured for a period of time. In embodiments, the period of time during which impulse noise is measured can be a predetermined period of time, wherein traffic is stopped or precluded from being transmitted on a measured channel while impulse noise is measured on the channel. In embodiments, the period of time during which impulse noise is measured can be a constant, intermittent, or periodic period of time that is equivalent to or less than a period of time during which no data transmissions are scheduled for a channel. Impulse noise in each of the plurality of channels can be measured, for example, by logic within a CMTS (e.g., impulse noise logic 330 of FIG. 3). For example, impulse noise logic 330 can isolate any impulse noise on a channel when the channel is silent (e.g., traffic is stopped on the channel, data packets are not being transmitted on the channel, no data transmissions are scheduled on the channel, etc.).

At 430, the measured impulse noise associated with each of the plurality of channels is converted to a frequency domain representation. The impulse noise associated with each of the plurality of channels can be defined in frequency domain, for example, by logic within a CMTS (e.g., impulse noise logic 330 of FIG. 3). For example, impulse noise logic 330 can convert a time domain measurement of impulse noise to the frequency domain using a Fourier transform (e.g., FFT 230 of FIG. 2).

After the measured impulse noise associated with each of the plurality of channels is converted to frequency domain representations, the process 400 can proceed to stage 440. At stage 440, the frequency domain representations of the measured impulse noise associated with each of the plurality of channels are added together. The frequency domains can be added together, for example, by logic within a CMTS (e.g., impulse noise logic 330 of FIG. 3).

After the frequency domains are added together, the process 400 can proceed to stage 450. At stage 450, the signal corresponding to the sum of frequency domain representations can be returned to the time domain. The sum of frequency domain representations can be returned to the time domain, for example, by logic within a CMTS (e.g., impulse noise logic 330 of FIG. 3). For example, the sum of frequency domain representations can be defined in time domain by applying an IFFT (e.g., IFFT 250 of FIG. 2) to the sum of frequency domain representations. In embodiments, the time domain representation of the sum of frequency domains can approximate the original impulse noise over a wide spectrum.

Figure 5:
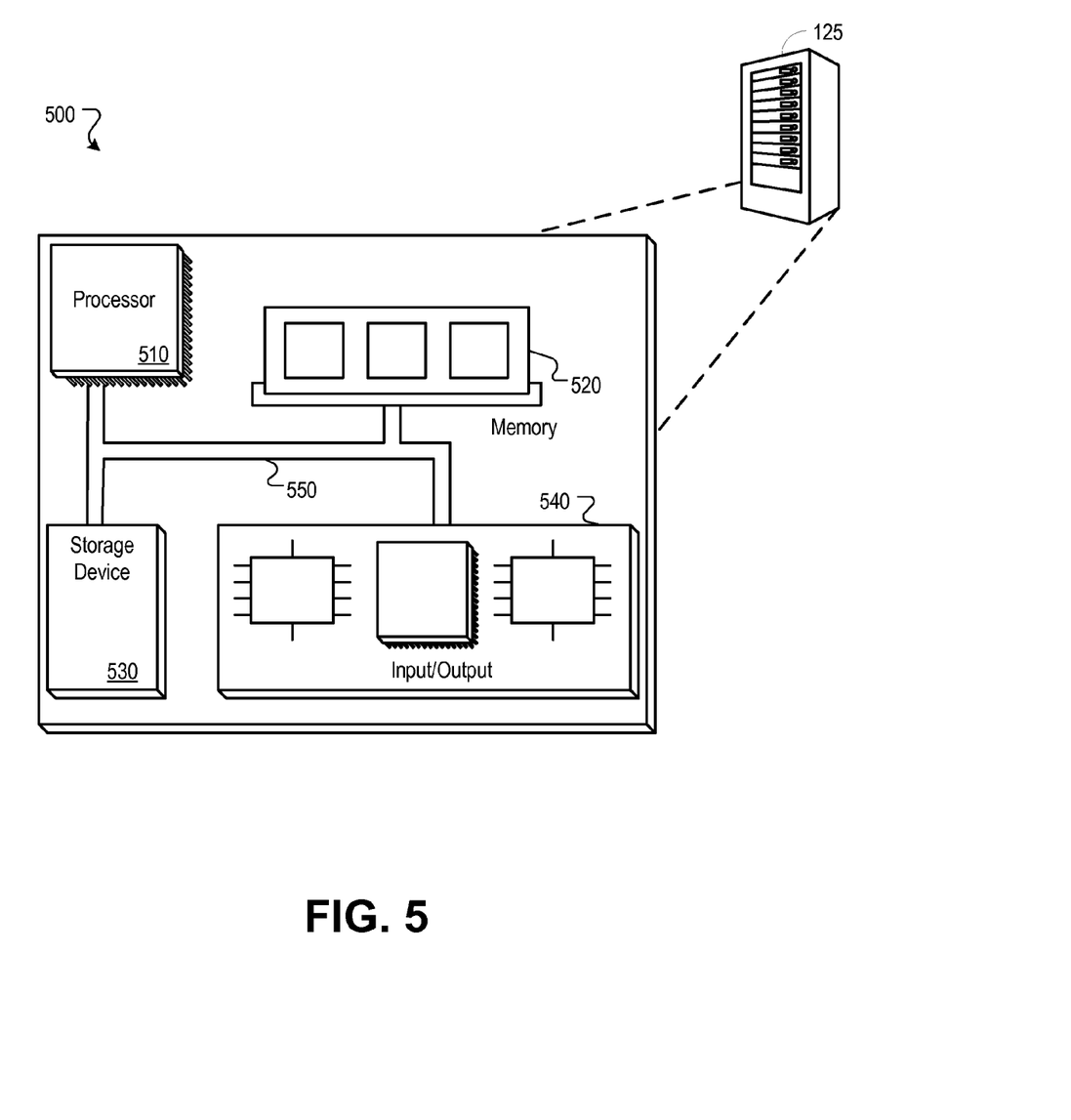
FIG. 5 is a block diagram of a hardware configuration operable to determine impulse noise over a wide spectrum based upon measurements of impulse noise associated with each of a plurality of channels.

FIG. 5 is a block diagram of a hardware configuration 500 operable to determine impulse noise over a wide spectrum based upon measurements of impulse noise associated with each of a plurality of channels. While a CMTS 125 is shown, it should be understood that other kinds of devices can operate to determine impulse noise over a wide spectrum based upon measurements of impulse noise associated with each of a plurality of channels. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a nonvolatile memory unit.

In embodiments, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to receive input data and send output data to other input/output devices, such as one or more display devices (e.g., television screen, computer monitor, etc.), as well as sending communications to, and receiving communications from one or more networks (e.g., HFC Network 120 of FIG. 1, network(s) 130 of FIG. 1, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal (e.g., a machine generated electrical, optical, or electromagnetic signal) that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display (e.g., a CRT (cathode ray tube) or LCD (liquid crystal display) monitor) for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that in embodiments the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In embodiments, multitasking and parallel processing may be advantageous.

I claim:

1. A computer-implemented method comprising:
   identifying a subset of channels within a wide spectrum;
   performing a bandwidth-limited impulse noise measurement within each of the identified channels, wherein the bandwidth-limited impulse noise measurement for each respective one of the identified channels is performed while there are no signals being transmitted along the respective one identified channel;
   converting the bandwidth-limited impulse noise measurements within each of the identified channels to a frequency domain representation;
   summing the frequency domain representations of impulse noise from the identified channels, thus creating a frequency domain representation of impulse noise over the subset of channels; and
   converting the frequency domain representation of impulse noise over the subset of channels to a time domain representation of impulse noise over the subset of channels; and
   approximating a level of impulse noise over the wide spectrum based upon the time domain representation of impulse noise over the subset of channels.

2. The computer-implemented method of claim 1, wherein the subset of channels comprises a plurality of channels that are not scheduled for signal transmission during a period of time.

3. The computer-implemented method of claim 1 further comprising:
   temporarily stopping signal transmissions on the identified subset of channels.

4. The computer-implemented method of claim 1, wherein performing a bandwidth-limited impulse noise measurement within an identified channel comprises isolating impulse noise by temporarily stopping traffic on the identified channel.

5. The computer-implemented method of claim 1, wherein performing a bandwidth-limited impulse noise measurement within an identified channel comprises capturing time domain samples of any of one or more signals on the identified channel.

6. The computer-implemented method of claim 1, wherein performing a bandwidth-limited impulse noise measurement within an identified channel is accomplished by a time domain capture capability of a cable modem termination system.

7. The computer-implemented method of claim 1, wherein converting the bandwidth-limited impulse noise measurement within each of the identified channels to a frequency domain representation is accomplished by applying a Fourier transform to each of the bandwidth-limited impulse noise measurements.

8. The computer-implemented method of claim 1, wherein converting the frequency domain representations of impulse noise over the subset of channels to a time domain representation is accomplished by applying an inverse Fourier transform to the frequency domain representations of impulse noise over the wide spectrum.

9. The computer-implemented method of claim 1 further comprising outputting the level of impulse noise over the wide spectrum.

10. The computer-implemented method of claim 1 further comprising:
    maintaining signal transmissions on channels, other than the identified subset of channels, within the wide spectrum.

11. A system comprising:
    an interface operable to be used to send and receive signals on a wideband spectrum;
    a data store operable to store computer program instructions and provide temporary storage for the system; and
    a processor operable to execute said computer program instructions, the computer program instructions being operable to cause the processor to:
    identify one or more channels within a wide spectrum;
    measure impulse noise within each of the identified channels, wherein the impulse noise measurement for each respective one of the identified channels is performed while there are no signals being transmitted along the respective one identified channel;
    convert the measured impulse noise within each of the identified channels to a frequency domain representation;
    sum the frequency domain representations of impulse noise within the identified channels, thus creating a frequency domain representation of impulse noise over the subset of channels; and
    convert the frequency domain representation of impulse noise over the subset of channels to a time domain representation of impulse noise over the subset of channels; and
    approximate a level of impulse noise over the wide spectrum based upon the time domain representation of impulse noise over the subset of channels.

12. The system of claim 11, wherein measuring impulse noise within an identified channel comprises isolating impulse noise by temporarily stopping traffic on the identified channel.

13. The system of claim 11, wherein measuring impulse noise within an identified channel comprises capturing time domain samples of any noise on the identified channel.

14. The system of claim 11, wherein measuring impulse noise within an identified channel is accomplished by a time domain capture capability of a cable modem termination system.

15. The system of claim 11, wherein converting the measured impulse noise within each of the identified channels to a frequency domain representation is accomplished by applying a Fourier transform to the measured impulse noise.

16. The system of claim 11, wherein converting the frequency domain representations of impulse noise over the subset of channels to a time domain representation is accomplished by applying an inverse Fourier transform to the frequency domain representations of impulse noise over the subset of channels.

17. One or more non-transitory computer readable media operable to execute on one or more processors, the computer readable being operable to cause the one or more processors to perform the operations comprising:

identifying one or more channels within a wide spectrum;

measuring impulse noise within each of the identified channels, wherein the impulse noise measurement for each respective one of the identified channels is performed while there are no signals being transmitted along the respective one identified channel;

converting the measured impulse noise within each of the identified channels to a frequency domain representation;

summing the frequency domain representations of impulse noise within the identified channels, thus creating a frequency domain representation of impulse noise over the subset of channels; and converting the frequency domain of impulse noise over the subset of channels to a time domain of impulse noise over the subset of channels; and approximating a level of impulse noise over the wide spectrum based upon the time domain representation of impulse noise over the subset of channels.

18. The one or more non-transitory computer readable media of claim 17, wherein measuring impulse noise within an identified channel comprises isolating impulse noise by temporarily stopping traffic on the identified channel.

19. The one or more non-transitory computer readable media of claim 17, wherein measuring impulse noise within an identified channel comprises capturing time domain samples of any noise on the identified channel.

20. The one or more non-transitory computer readable media of claim 17, wherein measuring impulse noise within an identified channel is accomplished by a time domain capture capability of a cable modem termination system.

* * * * *